July 16, 1963 J. B. MURDOCK ETAL 3,097,832
FURNACE FOR EXPANDING PERLITE AND SIMILAR SUBSTANCES
Filed Dec. 21, 1960 4 Sheets-Sheet 4

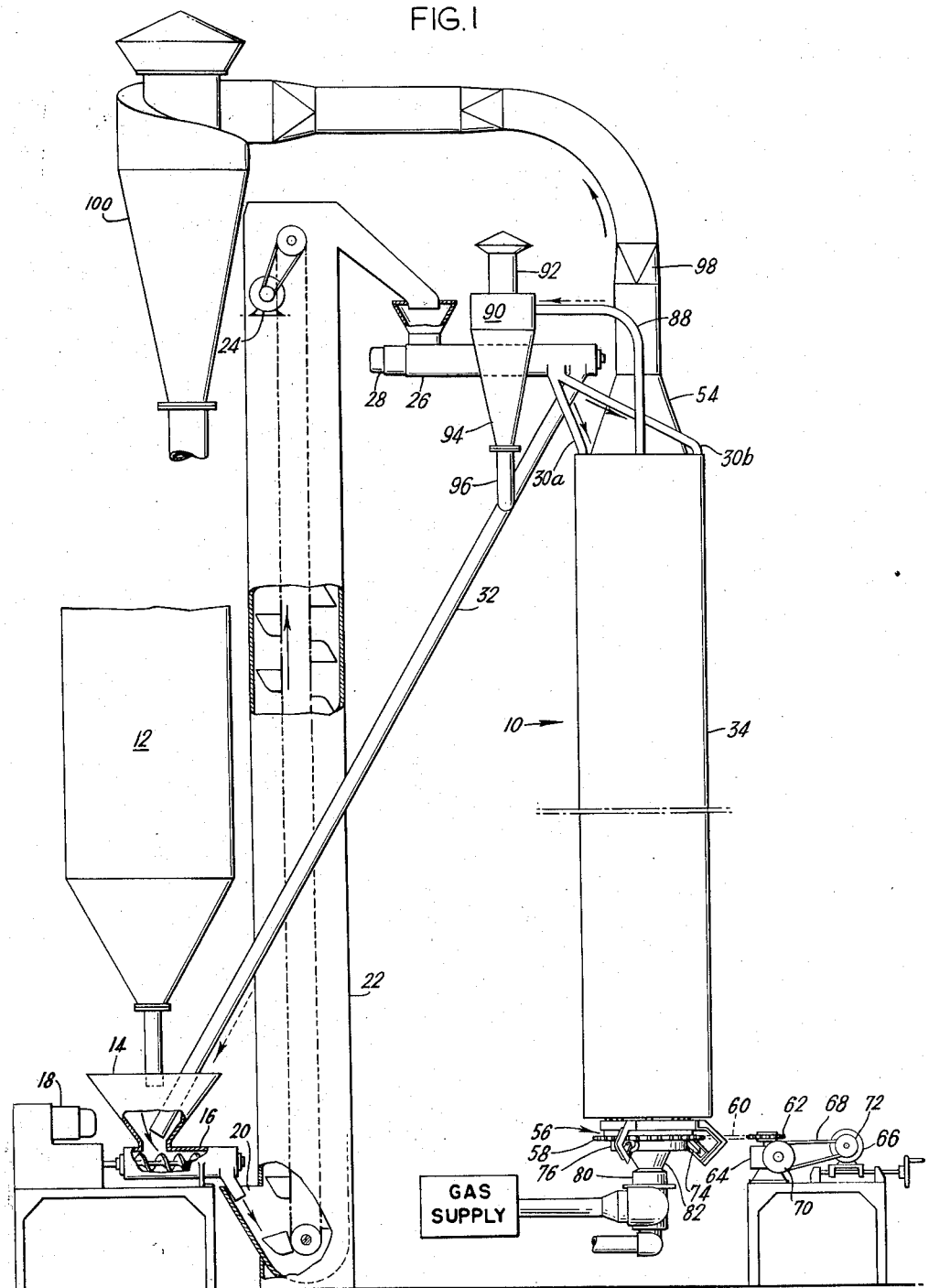

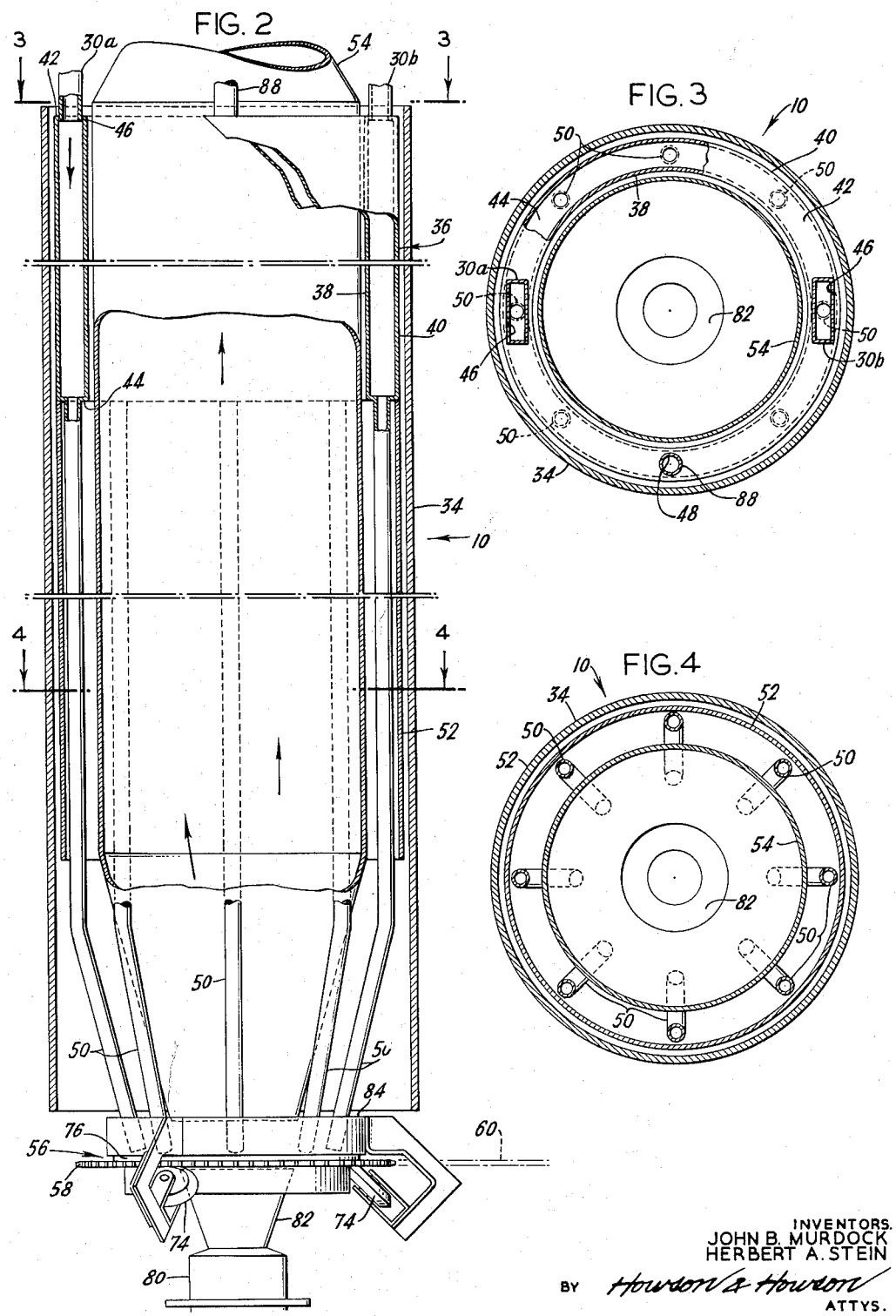

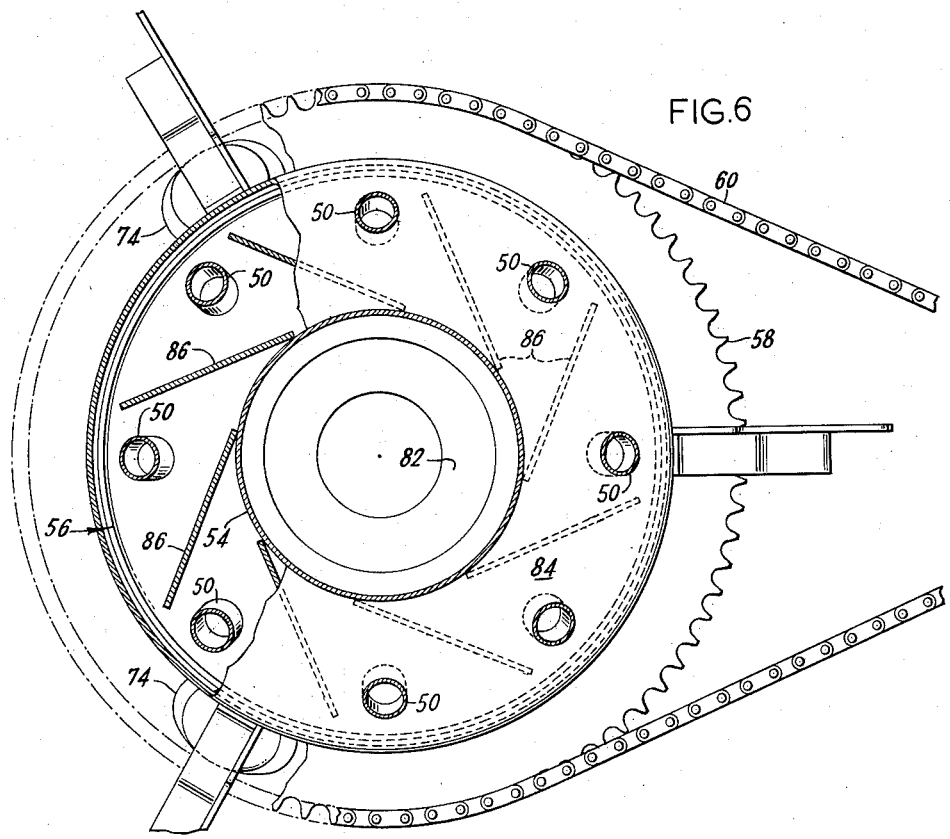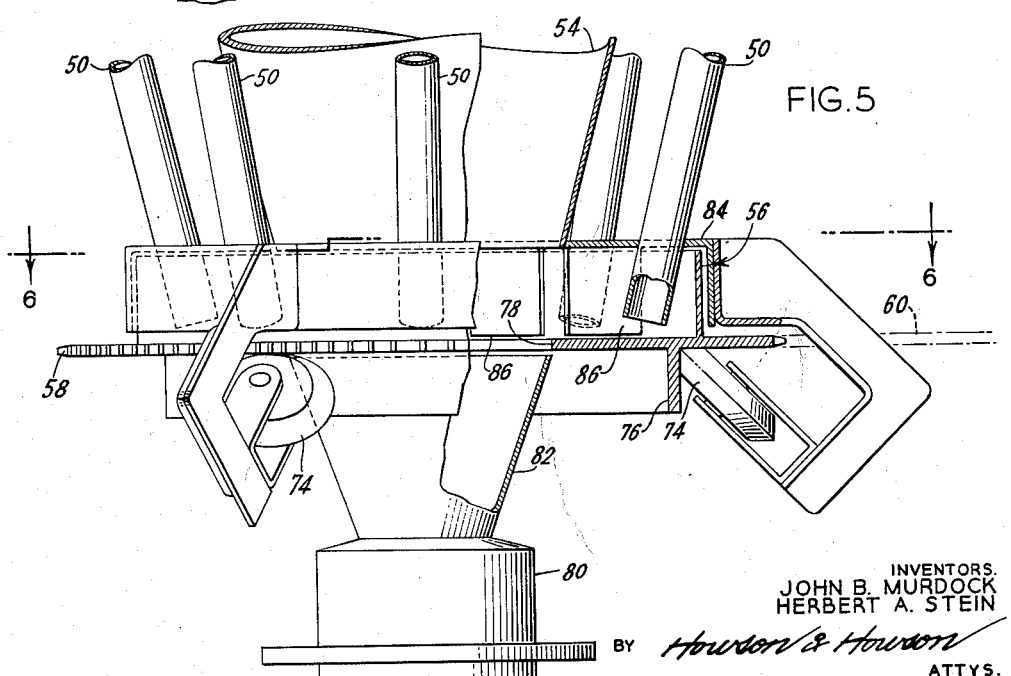

INVENTORS.
JOHN B. MURDOCK
HERBERT A. STEIN
BY Howson & Howson
ATTYS.

3,097,832
FURNACE FOR EXPANDING PERLITE AND SIMILAR SUBSTANCES
John B. Murdock, 15 Runnemede Ave., Lansdowne, Pa., and Herbert A. Stein, R.D. 2, Station Road, Glen Mills, Pa.
Filed Dec. 21, 1960, Ser. No. 77,354
16 Claims. (Cl. 263—21)

This invention relates to a method and means for expanding perlite and other materials which undergo a reduction in bulk density as a result of heating.

Perlite is a naturally occurring volcanic glass containing about 70% $SiO_2$, 15% $Al_2O_3$, small amounts of sodium, potassium, calcium, magnesium, iron and manganese oxides, and a variable amount of water. Some of this water is loosely held and can be driven off readily at low temperatures. A very small proportion of the contained water is so combined in the glass that it can be liberated by heat at the same time that the glass reaches a point of slight softness. This softness need not be very great, but only enough to allow the very high steam pressure from the liberated water to puff out the particle of glass into an agglomeration of glass-walled cells. Many types of volcanic glasses known geologically as pumice, obsidian, or pitchstone also possess this property, and it is customary in the perlite industry to refer to any expandable natural glass as perlite even though the geological name is different.

Perlite is usually mined from open quarries, crushed to the size of sand, and fed continuously into an expanding furnace. It is expanded in a number of different types of furnaces, almost all of which can be divided into two classes, horizontal and vertical. In a horizontal furnace, the velocity of the flame and resulting hot gases is generally rather low, and rotation or gravity is employed to remove the expanded material from the furnace. In a vertical furnace, however, it is generally considered desirable for the entire product to be discharged from the top of the furnace, and therefore sufficient hot gas velocity must be maintained to prevent any great amount of raw or partially expanded material from falling out of the bottom of the furnace. This high velocity may often cause some of the ore, especially the finer particles, to be blown out of the furnace before it has been properly expanded. This difficulty is experienced to a considerable degree in the common type of vertical perlite furnace where the ore is fed in through one or two holes in the furnace wall, located ¼ or ½ the length of the tube above the burner. Also, this method of introducing the feed results in uneven distribution of particles across the cross section of the furnace tube, thereby limiting the production rate of a given size of furnace, producing uneven expansion of the particles, and requiring more fuel than if the particles of crude perlite were properly distributed in the hot gases. Also because uneven distribution of the perlite granules produces differences in the temperature of the furnace tube, this type of feed arrangement tends to promote buckling of the furnace tube due to unequal expansion. Another cause of unequal expansion of different perlite granules is the injection or inspiration of cold air around the periphery of the burner where it enters the furnace tube. This is done for the purpose of cooling the inside surface of the furnace tube so as to prevent the fusion of perlite particles to the walls. We find that perlite is not sticky at the expansion temperature. Unlike crystalline materials, perlite—which is a glass—does not have a true melting point. Rather each particular type of perlite has a viscosity vs. temperature relationship in which the viscosity decreases continuously as temperature increases, or, phrasing the relation in another way, the particle of perlite becomes continuously softer as temperature increases, without any sharp point of demarcation between the solid and the liquid condition. Great softness would be required for a particle to become deformed by gravity and turn into a pool of liquid. Considerable softness would be required for one particle of perlite to adhere or fuse to another, or to the hot walls of a furnace. Since considerable pressure is generated by the liberation of water and generation of steam at the furnace operating temperature, it is not necessary for the perlite to become very soft in order for this great pressure to deform the particle into a vesicular mass.

Because of this fact, it is quite possible to expand perlite granules to a low density and still not fuse the expanded perlite to the walls of the furnace, if a uniform temperature is maintained throughout the furnace, said temperature being not essentially higher than the temperature required to produce the desired expansion. The practice of our invention, involving means for distributing the perlite particles essentially evenly throughout the furnace, along with conventional techniques of temperature control, achieves this desired condition of uniformity of temperature.

We, therefore, do not consider it desirable to pass cool air around the burner to cool the furnace walls. On the contrary, we prefer to allow the furnace walls to attain about the same temperature as the furnace space itself, because we have found that radiation from the walls of the furnace aids in the expansion of the granules passing through it.

In the expansion of most types of perlite, it has been found desirable to heat the granules to some intermediate temperature before introducing them into the flame. Heating the perlite granules to about 600° F. promotes more uniform expansion of the particles, reduces the fuel consumption per ton of product, and increases the capacity of a given size furnace. This heating is conventionally done in a separate rotary heater, usually fired by a separate burner, although sometimes the flue gases from the furnace tube are utilized as a heat source. Our invention provides a means for heating the perlite granules with heat radiated from the furnace tube, before the perlite granules are fed into the furnace. This is done by passing the granules through a duct system located around the outside of the furnace tube, with a gap between the furnace tube and the heating chamber to prevent the development of excessive temperatures which might drive off too much of the combined water in the perlite and render it incapable of subsequent expansion.

The purpose of the present invention is to provide a means whereby perlite particles may be introduced in a uniform pattern at the bottom of the furnace, so as to utilize the entire length of the furnace tube for the expansion process and to cause the perlite particles to be distributed evenly across the cross section of the tube. Another purpose of this invention is to increase the production rate of a given size of furnace, and to reduce the amount of fuel necessary to fully expand a given quantity of crude perlite. Still another object of this invention is to provide means whereby the particles of crude perlite may be heated before being fed into the furnace, using as a heat source the heat which is radiated from the outside of the furnace tube.

Additional objects, advantages, and purposes of the invention will be more readily apparent from the following detailed description of embodiments of the invention taken together with the accompanying drawings in which:

FIG. 1 is a fragmentary schematic external view of a furnace construction in accordance with the invention;

FIG. 2 is an elevational view, parts being in section and parts broken away, of a furnace tube and preheating ducts associated therewith;

FIG. 3 is a view taken on line 3—3 of FIG. 2;

FIG. 4 is a sectional view taken on line 4—4 of FIG. 2;

FIG. 5 is a fragmentary elevational view, parts being broken away, of feeding mechanism for the furnace;

FIG. 6 is a view taken on line 6—6 of FIG. 5;

Figure 7:
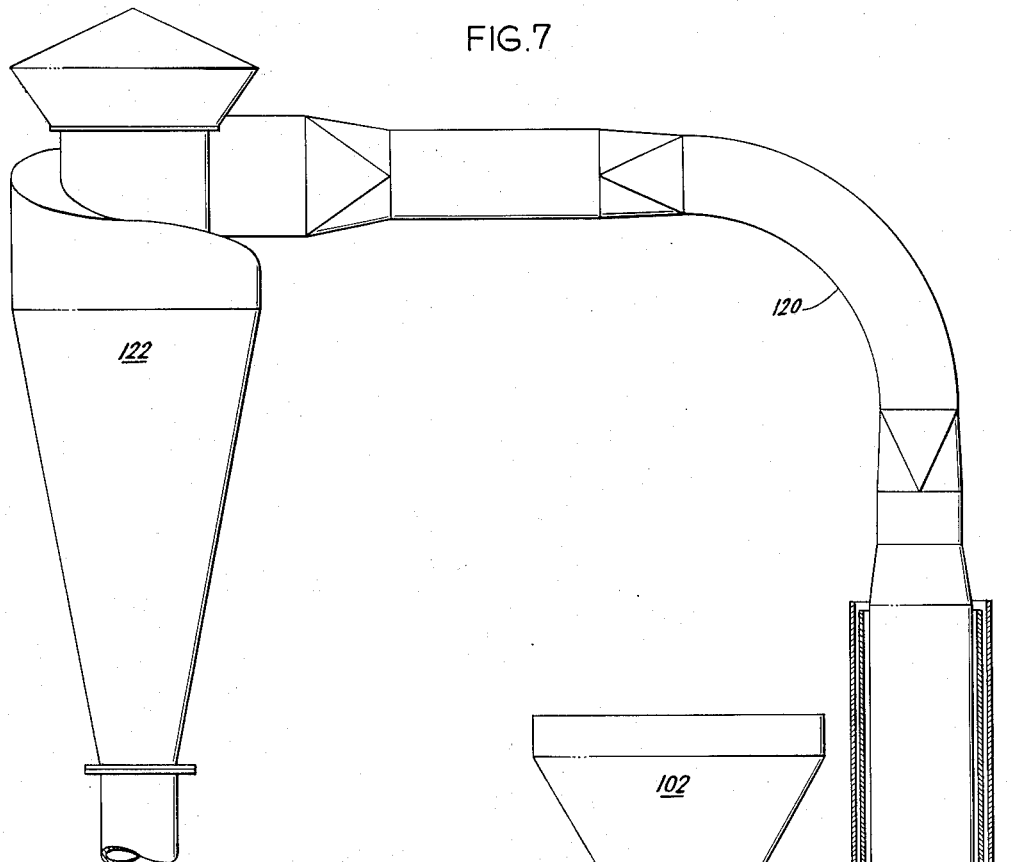
FIG. 7 is a schematic external view of an alternate construction utilizing a different material feed arrangement.
Figure 8:
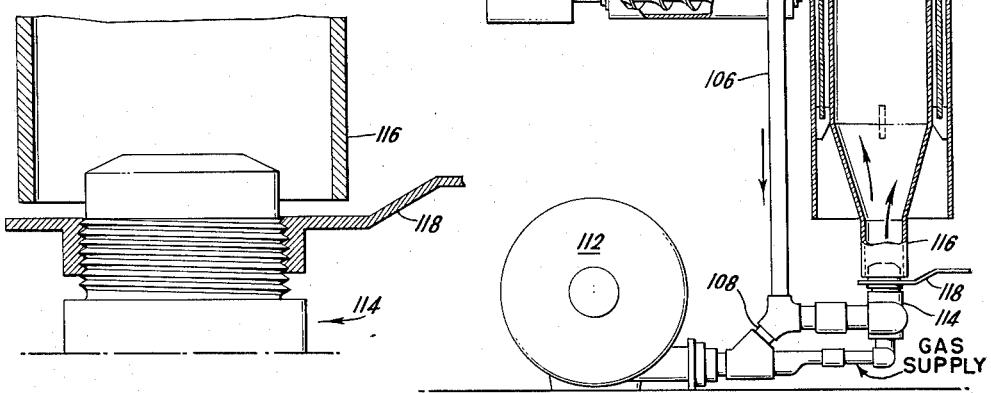
FIG. 8 is a fragmentary view, partly in section, of an adjustable register adapted to selectively close the space between a burner and a furnace tube.

Referring to the drawings broadly, there are shown two embodiments of apparatus which can be used in practicing the invention, although manifestly the invention is not limited thereto and the apparatus may take specifically different forms within the scope of the invention.

FIG. 1 shows a complete installation embodying the present invention. This includes a furnace generally designated 10. A silo 12 is adapted to hold crude perlite and discharge it into a bin 14 therebelow. Attached to the bottom of the bin 14 is a screw conveyor 16 adapted to be driven by a suitable variable speed motor 18. The discharge end of the screw conveyor 16 is located above the receiving opening 20 of the boot of a bucket elevator 22 adapted to be driven at a fixed speed by a gear-head motor 24. The discharge of the elevator 22 is connected to a screw conveyor 26 driven at a fixed speed by a gear-head motor 28. The discharge end of the trough of the screw conveyor 26 is connected to two ducts 30a and 30b which communicate with the top of a distributing box within the furnace 10 and which will be described in more detail with respect to FIGS. 2-4 inclusive.

Beyond the point of intersection of the ducts 30a and 30b and the screw conveyor 26 there is another duct 32. This duct 32 like the ducts 30a and 30b is attached into the trough of the screw conveyor 26 and this duct 32 then slopes downwardly to the bin 14.

The structure of the furnace 10 is shown in detail in FIGS. 2-4 inclusive. This furnace 10 includes a casing 34 within which is a distributing box 36. This box is a cylindrical metal container having an inner cylindrical wall 38 and an outer cylindrical wall 40. The space between the inner and outer cylinders is covered at the top and bottom with metal rings 42 and 44. The top ring 42 has two holes 46 to allow the distributing box 36 to be continuously filled with crude perlite, and a vent hole 48. The lower ring 44 has a multiplicity of circular openings attached to which are the preheat pipes 50. Surrounding the preheat pipes 50 is a metal cylinder 52 having a diameter essentially the same as the outer wall 40 of the distributing box 36. This cylinder 52 extends from the bottom of the distributing box 36 to a point slightly above the bottom of furnace tube 54. This furnace tube 54 is of a diameter sufficiently smaller than the inner wall 38 of the distributing box 36 so as to provide an air space through which air may pass by convection in order to prevent overheating of the distributing box and the preheat pipes. The bottoms of the pipes 50 terminate about ½" from the surface of a rotating pan 56 shown in detail in FIGURE 5 and FIGURE 6. This pan has sprocket teeth 58 around its periphery, rotation being produced by means of a chain 60, and a drive sprocket 62 which is mounted on and rotated by a suitable source of slow speed rotation such as the gear box 64. This gear box 64 is driven by an electric motor 66 at a variable rate of speed, by means of a belt 68, a fixed diameter pulley 70, and a variable diameter pulley 72, or by any other suitable variable speed drive. The rotating pan 56 is mounted on three inclined rollers 74 which both support the pan and keep it from moving out of position. This is accomplished by having the three rollers 74 bearing against a cylindrical ring 76 attached to the bottom surface of the rotating pan 56.

The rotating pan 56 has a hole 78 in the center of sufficient size to allow the fire from the burner 80 to pass upwardly through it. Attached to the burner 80 is a conical metal tunnel 82 which conducts the flame from the burner to the hole 78 in the rotating pan 56. This tunnel 82 comes within a fraction of an inch from the pan 56, in order to essentially block off the entrance of cool air into the furnace.

The preheat pipes 50 are attached at a point slightly above their bottoms, to the feeder cover 84, from which are suspended stationary vanes 86, set at an angle to the outer circumference of the feeder cover 84. The outer ends of the vanes 86 are almost touching the outside of the feeder cover 84, and the inner ends are essentially tangent to hole 78 in the pan 56. The vanes 86 and the edge of the hole 78 at this point of tangency form a V pointing in the direction of rotation of the pan 56.

Attached to the hole 48 in the top of the distributing box 36 is a vent pipe 88 which communicates to a cyclone type dust collector 90 which has two other apertures, an air outlet 92 and a collected material outlet 94. This outlet is connected to the duct 32 by means of a pipe 96. The top of the furnace tube 54 is connected by a duct 98 to a suitable cyclone collector 100.

FIGURE 7 illustrates another embodiment of the present invention for producing an even distribution of perlite granules in the flame. This particular feeding means could be connected up to a duct means for heating the crude perlite granules like that shown in FIG. 1. However, in FIG. 7, the crude perlite supply bin 102 is connected directly to a feeder 104 which in turn is connected to a pipe 106 leading to the burner air supply pipe 108. The feeder 104 may be a screw feeder driven by a suitable variable speed motor 110. Air from a motorized burner blower 112 passes through the burner air supply pipe 108 into the burner 114 which is directed upwardly into the furnace tube 116. An adjustable register 118 is so placed as to essentially close in the space between the burner 114 and the furnace tube 116. The upper end of the furnace tube 116 is connected to a duct 120 which carries the hot gases and expanded perlite to a suitable cyclone collector 122.

The operation of the embodiment of FIGS. 1 through 6 is as follows:

Crude perlite stored in the silo 12 is allowed to constantly replenish the level of the ore in the bin 14. The rate of feed of crude perlite from the bin 14 into the elevator 22 is adjustable by means of the variable speed motor 18 which drives the screw feeder 16. The elevator 22 carries the perlite up into the fixed speed screw conveyor 26 which discharges into the two ducts 30a and 30b. These conduct the perlite into the distributing box 36 from which it passes into the heating pipes 50. When the pan 56 is not rotating, the perlite cannot flow into the furnace because of the closeness of the bottom of the pipes 50 to the surface of the pan 56. However, rotating the pan 56 causes perlite to be drawn from the bottom of the pipes 50, and the stationary vanes 86 wipe the perlite off the pan 56 and conduct it through the hole 78 into the flame and hot gases issuing upwardly from the burner 80, and into the furnace tube 54.

The perlite granules are expanded inside of the furnace, where the temperature is maintained at a point sufficient to produce the desired expansion ratio, but insufficient to produce fusion of the particles to each other or to the furnace walls. No extra air is needed to cool the inside of the furnace tube, because the average temperature is carefully controlled and the distribution of perlite granules in the flame is so uniform, due to the method of feeding, that no points of excessive or insufficient temperature are developed inside the furnace tube.

The expanded perlite and hot gases are conducted to the cyclone separator 100, which removes the product from the gases and discharges the expanded material out of the bottom, to be stored, bagged, or used in a further process.

The variable feed screw 16 must be set for a feed rate somewhat in excess of the amount being fed directly into the furnace by the rotating pan 56. This keeps the pipes 50 and the ducts 30a and 30b full at all times, and the excess is conveyed by the fixed speed screw conveyor 26 into the overflow duct 32 and back down to the bin 14.

Steam generated due to driving off the loosely held water in the perlite granules accumulates in the pipes 50 and the distributing box 36. To avoid a build-up of pressure, vent pipe 88 is provided to allow this steam to be discharged. This steam and any hot air entrained therein are likely to contain fine granules of perlite, which are collected in the cyclone separator 90 and deposited in the overflow pipe 32 to be carried back to the bin 14.

The embodiment of FIG. 7 operates as follows: Perlite granules stored in the feed bin 102 are fed continuously at an adjustable rate by the screw feeder 104 into the burner air supply pipe 108. There the perlite is mixed with the air flowing through the burner air pipe and the burner 114, and the mixture is ejected upward into the furnace tube 116. The walls of the furnace tube 116 are kept hot because essentially no cooling air is allowed to enter around the burner 114. The expanded material and hot gases are removed from the furnace through the duct 120 to cyclone collector 122 which removes the product from the hot gases stream.

Manifestly minor changes can be effected in the described apparatus without departing from the spirit and scope of the invention as defined in and limited solely by the appended claims.

We claim:

1. A furnace for expanding perlite granules and the like, comprising an essentially vertical furnace tube, a burner providing an upwardly directed flame and hot gases inside of the furnace tube, duct means for passing perlite granules around the outside of the furnace tube, said perlite granules being heated by heat transmitted from the outside of said furnace tube, means for constantly filling the upper end of said duct means with perlite granules, a rotating disc located below the bottom of the said ducts, a central hole in said rotating disc through which passes the flame and hot gases from the burner, means for moving said perlite granules off said rotating disc into the flame, and duct means for conducting the hot gases and expanded perlite granules out of the furnace into a suitable collection system.

2. A furnace for expanding perlite granules and the like, comprising an essentially vertical furnace tube, a burner providing an upwardly directed flame and hot gases inside of the furnace tube, duct means for passing perlite granules around the outside of the furnace tube, said perlite granules being heated by heat transmitted from the outside of said furnace tube, means for constantly filling the upper end of said duct means with perlite granules, a rotating disc located below the bottom of the said ducts, a central hole in said rotating disc through which passes the flame and hot gases from the burner, means for adjusting the speed of rotation of said disc, means for moving said perlite granules off said rotating disc into the flame, and duct means for conducting the hot gases and expanded perlite granules out of the furnace into a suitable collection system.

3. A furnace for expanding perlite granules and the like, comprising an essentially vertical furnace tube, a burner providing an upwardly directed flame and hot gases inside of the furnace tube, duct means for passing perlite granules around the outside of the furnace tube, said perlite granules being heated by heat transmitted from the outside of said furnace tube, means for constantly filling the upper end of said duct means with perlite granules, a rotating disc located below the bottom of the said ducts, a central hole in said rotating disc through which passes the flame and hot gases from the burner, means for adjusting the speed of rotation of said disc, stationary vane means disposed in proximity to the upper surface of said disc at an angle to the circumference thereof, said angle being such as to cause the perlite granules lying on said rotating disc to be moved off the disc and into the flame through the aforementioned central hole in said disc, and duct means for conducting the hot gases and expanded perlite granules out of the furnace into a suitable collection system.

4. A furnace for expanding perlite granules and the like, comprising an essentially vertical furnace tube, a burner providing an upwardly directed flame and hot gases inside of the furnace tube, duct means for passing perlite granules around the outside of the furnace tube, said perlite granules being heated by heat transmitted from the outside of said furnace tube, means for constantly filling the upper end of said duct means with perlite granules, said furnace tube and said duct means being spaced to form a gap therebetween whereby to limit the amount of heat transmitted from the furnace tube to the perlite granules passing through said duct means, a rotating disc located below the bottom of the said ducts, a central hole in said rotating disc through which passes the flame and hot gases from the burner, means for adjusting the speed of rotation of said disc, means for moving said perlite granules off said rotating disc into the flame, and duct means for conducting the hot gases and expanded perlite granules out of the furnace into a suitable collection system.

5. A furnace for expanding perlite granules and the like, comprising an essentially vertical furnace tube, a burner providing an upwardly directed flame and hot gases into the bottom of the furnace tube, means for restricting the amount of secondary air entering between the burner and the bottom of the furnace tube to eliminate a zone of cooler temperature along the inside surface of the furnace tube and to insure that an essentially uniform temperature is held through the cross-section of said furnace tube, duct means for passing perlite granules around the outside of the furnace tube, said perlite granules being heated by heat transmitted from the outside of said furnace tube, means for constantly filling the upper end of said duct means with perlite granules, a rotating disc located below the bottom of the said ducts, a central hole in said rotating disc through which passes the flame and hot gases from the burner, means for moving said perlite granules off said rotating disc into the flame, and duct means for conducting the hot gases and expanded perlite granules out of the furnace into a suitable collection system.

6. A furnace for expanding perlite granules and the like, comprising an essentially vertical furnace tube, a burner providing an upwardly directed flame and hot gases into the bottom of the furnace tube, means for restricting the amount of secondary air entering between the burner and the bottom of the furnace tube to eliminate a zone of cooler temperature along the inside surface of the furnace tube and to insure that an essentially uniform temperature is held through the cross-section of said furnace tube, duct means for passing perlite granules around the outside of the furnace tube, said perlite granules being heated by heat transmitted from the outside of said furnace tube, means for constantly filling the upper end of said duct means with perlite granules, a rotating disc located below the bottom of the said ducts, a central hole in said rotating disc through which passes the flame and hot gases from the burner, means for adjusting the speed of rotation of said disc, means for moving said perlite granules off said rotating disc into the flame, and duct means for conducting the hot gases and expanded perlite granules out of the furnace into a suitable collection system.

7. A furnace for expanding perlite granules and the like, comprising an essentially vertical furnace tube, a burner providing an upwardly directed flame and hot gases into the bottom of the furnace tube, means for restricting the amount of secondary air entering between the burner and the bottom of the furnace tube to eliminate a zone of cooler temperature along the inside surface of the furnace tube and to insure that an essentially uniform temperature is held through the cross-section of said furnace tube, duct means for passing perlite granules around the outside of the furnace tube, said perlite granules being heated by heat transmitted from the outside of said furnace tube, means for constantly filling the upper end of said duct means with perlite granules, a rotating disc located below the bottom of the said ducts, a central hole in said rotating disc through which passes the flame and hot gases from the burner, means for adjusting the speed of rotation of said disc, stationary vane means disposed at an angle to the circumference of said rotating disc, said angle being such as to cause the perlite granules lying on said rotating disc to be moved off the disc and into the flame through the aforementioned central hole in said disc, and duct means for conducting the hot gases and expanded perlite granules out of the furnace into a suitable collection system.

8. A furnace for expanding perlite granules and the like, comprising an essentially vertical furnace tube, a burner providing an upwardly directed flame and hot gases into the bottom of the furnace tube, means for restricting the amount of secondary air entering between the burner and the bottom of the furnace tube to eliminate a zone of cooler temperature along the inside surface of the furnace tube and to insure that an essentially uniform temperature is held through the cross-section of said furnace tube, duct means for passing perlite granules around the outside of the furnace tube, said perlite granules being heated by heat transmitted from the outside of said furnace tube, means for constantly filling the upper end of said duct means with perlite granules, said furnace tube and said duct means being spaced to form a gap therebetween whereby to limit the amount of heat transmitted from the furnace tube to the perlite granules passing through said duct means, a rotating disc located below the bottom of the said ducts, a central hole in said rotating disc through which passes the flame and hot gases from the burner, means for adjusting the speed of rotation of said disc, means for moving said perlite granules off said rotating disc in the flame, and duct means for conducting the hot gases and expanded perlite granules out of the furnace into a suitable collection system.

9. A feeder for feeding perlite granules into a furnace, comprising a multiplicity of essentially vertical ducts, means for constantly filling the upper ends of said ducts with perlite granules, a rotating disc located below the bottom of the said ducts, a burner, a central hole in said rotating disc through which passes the flame and hot gases from the burner, and means for moving said perlite granules off said rotating disc into the flame.

10. A feeder for feeding perlite granules into a furnace, comprising a multiplicity of essentially vertical ducts, means for constantly filling the upper ends of said ducts with perlite granules, a rotating disc located below the bottom of the said ducts, a burner, a central hole in said rotating disc through which passes the flame and hot gases from the burner, means for adjusting the speed of rotation of said disc, and means for moving said perlite granules off said rotating disc into the flame.

11. A feeder for feeding perlite granules into a furnace, comprising a multiplicity of essentially vertical ducts, means for constantly filling the upper ends of said ducts with perlite granules, a rotating disc located below the bottom of the said ducts, a burner, a central hole in said rotating disc through which passes the flame and hot gases from the burner, means for adjusting the speed of rotation of said disc, and stationary vane means disposed at an angle to the circumference of said rotating disc, said angle being such as to cause the perlite granules lying on said rotating disc to be moved off the disc and into the flame through said central hole in said disc.

12. A feeder for feeding perlite granules into a furnace, comprising a multiplicity of ducts set at a sufficiently steep angle so as to allow perlite granules to flow through said ducts by gravity, means for constantly filling the upper ends of said ducts with perlite granules, a rotating disc located below the bottom of the said ducts, a central hole in said rotating disc adapted for passage therethrough of flame and hot gases from a burner, means for adjusting the speed of rotation of said disc, and stationary vane means disposed at an angle to the circumference of said rotating disc, said angle being such as to cause the perlite granules lying on said rotating disc to be moved off the disc and into the flame through said central hole in said disc.

13. A furnace for expanding perlite granules and the like comprising an essentially vertical furnace tube, a burner providing an upwardly directed flame and hot gases inside of said furnace tube, an outer cylinder surrounding said furnace tube, a plurality of vertical duct means around the outside of said furnace tube between said tube and said cylinder spaced from said tube in heat transferring relation therewith, means operable to continuously maintain said vertical ducts filled with perlite, feed means for uniformly feeding the perlite from the lower end of each of said vertical ducts into said furnace tube, and duct means for conducting the hot gases and expanded perlite granules out of the furnace into a suitable collection system, the size of each of said ducts and the flow of perlite granules through each duct effecting a uniform retention time of the perlite granules in said ducts and a controlled uniform preheating thereof.

14. In a furnace for expanding perlite granules and the like having an essentially vertical furnace tube, a burner providing an upwardly directed flame and hot gases inside of the furnace tube, and duct means for conducting perlite granules to the furnace, the improvement of perlite feed means comprising a rotating disc located below the duct means, a central hole in said rotating disc through which passes the flame and hot gases from the burner, and means for moving said perlite granules off said rotating disc into the flame.

15. A furnace for expanding perlite granules and the like, comprising an essentially vertical furnace tube, a burner providing an upwardly directed flame and hot gases inside of said furnace tube, an outer cylinder surrounding said furnace tube, said outer cylinder spaced from said furnace tube, duct means for perlite granules passing between said furnace tube and said outer cylinder, said duct means spaced from said furnace tube and said outer cylinder, means for continuously maintaining said duct means filled with perlite granules, the perlite granules being preheated by heat transmitted from said furnace tube, feed means at the lower end of said duct means for substantially uniformly feeding the preheated perlite granules into the furnace tube, and duct means for conducting the hot gases and expanded perlite granules out of the furnace tube into a suitable collection system, the uniform feeding of granules from said filled vertical duct means providing uniform retention time of the granules in said spaced duct means and hence controlled uniform preheating of the granules.

16. A furnace as claimed in claim 15 wherein said duct means for perlite granules passing between said furnace tube and said outer cylinder comprises a plurality of substantially vertical ducts.

References Cited in the file of this patent
UNITED STATES PATENTS

| | | |
|---|---|---|
| 2,639,132 | Bradford | May 19, 1953 |
| 2,746,735 | Bradford | May 22, 1956 |
| 2,782,018 | Bradford | Feb. 19, 1957 |
| 2,947,115 | Wood | Aug. 2, 1960 |
| 2,978,339 | Veatch et al. | Apr. 4, 1961 |